Sept. 15, 1959 L. B. SWANSON ET AL 2,904,339
CENTERING CHUCKS
Filed Jan. 29, 1957 7 Sheets-Sheet 1

INVENTORS.
LINWOOD B. SWANSON.
JEROME J. RUTHERFORD JR.
BY

*Louis V. Lucia*
ATTORNEY.

Sept. 15, 1959 L. B. SWANSON ET AL 2,904,339
CENTERING CHUCKS
Filed Jan. 29, 1957 7 Sheets-Sheet 2

Fig. 3.

INVENTORS.
LINWOOD B. SWANSON.
BY JEROME J. RUTHERFORD JR.

Louis V. Lucia
ATTORNEY.

Sept. 15, 1959  L. B. SWANSON ET AL  2,904,339
CENTERING CHUCKS
Filed Jan. 29, 1957  7 Sheets-Sheet 4

INVENTORS.
LINWOOD B. SWANSON.
JEROME J. RUTHERFORD JR.
BY
ATTORNEY.

Sept. 15, 1959     L. B. SWANSON ET AL     2,904,339
CENTERING CHUCKS Filed Jan. 29, 1957                                                           7 Sheets-Sheet 6

INVENTORS.
LINWOOD B. SWANSON.
JEROME J. RUTHERFORD JR.
BY

ATTORNEY.

United States Patent Office 2,904,339
Patented Sept. 15, 1959

2,904,339

CENTERING CHUCKS

Linwood B. Swanson, Newington, and Jerome J. Rutherford, Jr., Granby, Conn., assignors to The Cushman Chuck Company, Hartford, Conn., a corporation of Connecticut Application January 29, 1957, Serial No. 637,003

14 Claims. (Cl. 279—112)

This invention relates generally to chucks and more particularly to chucks for use in turning machines such as vertical or horizontal lathes and the like.

It is an object of the present invention to provide certain improvements in chucks of the type shown and described in United States Patent No. 2,757,009, dated July 31, 1956.

A further object of this invention is to provide such chucks with improved centering means for quickly and easily centering a ring, or other like workpiece, prior to clamping it in position on said chuck.

A further object of our invention is the provision of an improved mechanism for operating the centering means.

A further object is to provide structural improvements for the work clamping jaws of said chucks and novel means for simultaneously operating a plurality of said jaws into or out of clamping position.

A still further object is the provision of certain other improvements in the construction of said chucks.

Further objects and advantages of the present invention will be more fully understood from the following description and the accompanying drawings in which.

In the embodiment of our invention illustrated in the drawings, the numeral 5 denotes the base of our improved chuck which is preferably constructed of a light metal, such as aluminum, and has therein a plurality of radial slots 6 in each of which there is mounted a clamping jaw unit that is contained in a suitable liner, or bar, 7 that is constructed of a more durable metal, such as steel, and is preferably secured to the base by means of screws 8. The said bar has therein a longitudinal slot 9 with opposed lateral slots 10—10 in the sides thereof and in each of said slots 9 there is slidably contained a set of master jaws which preferably include a main master jaw 11 and supplemental master jaws 12 and 13. A clamping screw 14 is rotatably secured to said main master jaw 11 and has oppositely threaded end portions 15 and 16 which are threaded to the jaws 12 and 13, respectively, for moving said supplemental master jaws relatively to the main master jaw. The said screw 14 has an extension 17 by means of which it is rotated in opposite directions.

Each of the said clamping jaw units is preferably operated by a suitable motor, such as a conventional air motor indicated at 18, which is mounted in a recess 19 in the respective bar 7 and secured thereto by a set screw 20. The said motor has a drive shaft 18–a and is preferably connected to rotate its respective screw 14 by means of a gear train including a pinion 21 that is secured to said drive shaft, an idler gear 22, and a driven gear 23 which is slidably connected to the extension 17 by means of an axial recess 24 in said gear that slidably and non-rotatably receives the extension 17 and serves also as a socket in which may be inserted a suitable tool when it is desired to rotate the screw 14 manually. The said train of gears is preferably contained within a gear box 25 which has a gear cover 26 and is secured to its respective bar 7 by means of screws 27.

Each of the said master jaws has, upon the opposite sides thereof, lateral flanges 28—28 which fit within the lateral slots 10—10 and slidably secure the master jaws to their respective bar. The said master jaws are adapted to have mounted thereon suitable top jaws which include a top jaw 29 that is secured to the central master jaw 11 and a supplemental top jaw 30 that, as shown, is secured to the supplemental master jaw 13. By providing three master jaws in each of the bars, it is rendered possible to mount the top jaws on any combination of two of said master jaws so that a workpiece may be clamped between a pair of top jaws mounted on master jaws 11 and 13, or 11 and 12, or 12 and 13, and thereby accommodate workpieces in a wide range of sizes without requiring any changes or adjustments in the position of the clamping jaws sets upon the chuck base.

Figures 14, 15:
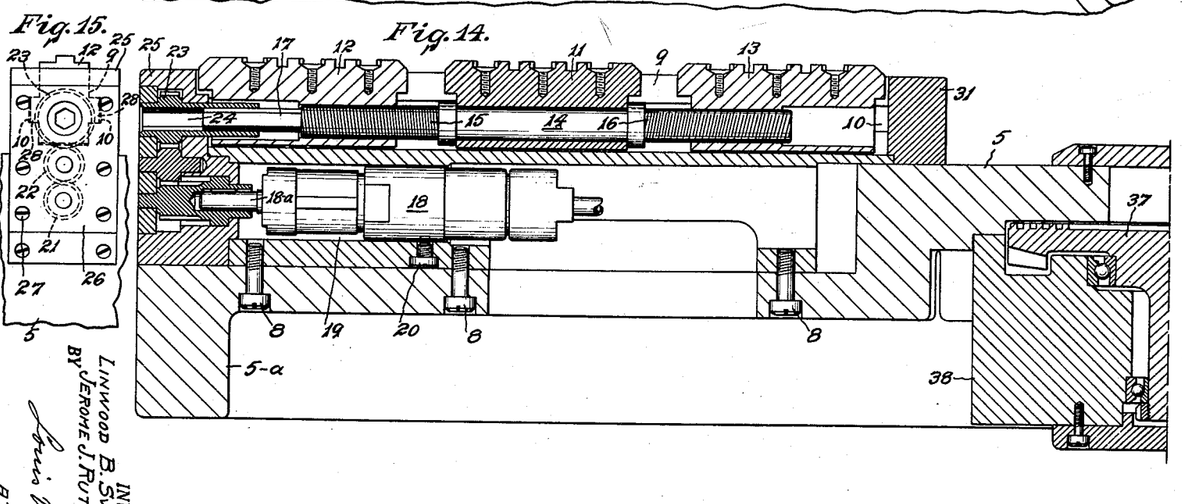
Fig. 14 is a sectional side view on line 14—14 of Fig. 13 with parts thereof shown in elevation.
Fig. 15 is an end view of said clamping jaw unit.

It will be noted from Fig. 14 that the screw 14 is rotatable in the main master jaw 11 and is secured thereto against axial movement so that said master jaw is stationary relatively to the screw, but is freely slidable with said screw in the slots 9 and 10—10 and with the master jaws 12 and 13 as a complete set of master clamping jaws. After one of the master jaws 12 or 13 has engaged one side of the workpiece, further rotation of the screw 14 will pull the master jaw 11 towards the opposite side of the workpiece and the screw 14 will move therewith so that the extension 17 will slide in the axial recess 24 until the master jaw 11 is forced into contact with the workpiece and said workpiece is securely clamped between the two master jaws; the longitudinal movement of the said set within the said respective slots being limited by the members 25 and 31 which close the ends of the slots. The end portion 17 of the said clamping screw is also slidable in the recess 24 of the gear 23 so that the screw will be rotatable by said gear regardless of the movement of the jaw set in its respective slots.

When in their unclamped condition, each set of jaws is normally floating within its respective slot 9 and will freely move longitudinally therein to become located in accordance with the particular position of the workpiece 88 as positioned by the centering means with respect to the axis of the chuck. Therefore, as each floating jaw set is being brought into clamping engagement with said workpiece, by rotation of the respective screw 14, the jaw unit of said set which first engages the workpiece will come to rest, as it engages one side thereof, because the workpiece is being held stationary by the centering means. The other jaw unit will then move toward the workpiece until it engages the opposite side thereof. Further rotation of the clamping screw will then tighten the upper portions of the jaw units against the opposite sides of the workpiece and, at the same time, the clamping force applied to the jaw units by such rotation of the screw will also tend to force the bottom portions of said jaw units toward each other and thereby apply a force upon each of the master jaws which will theoretically tilt them in opposite directions and cause the tops and bottoms of their respective flanges 28—28 to become clamped against their respective sides of the slots 10—10 and thereby firmly bind said jaw sets to the base member 5 so as to clamp the workpiece against lateral and rotational movement with relation to the chuck.

It will be clearly understood from the above description that our invention generally provides a self-adjusting or floating set of clamping jaws which will first adjust itself in accordance with the position of a workpiece which is being clamped therebetween, and then automatically bind itself in position as the jaws are tightened upon the said workpiece, so that the rotation of the clamping screw of each set of jaws performs two operations; namely, that of moving the jaws to their accurate work engaging position and that of securing the jaws in position upon the chuck, or other carrier or base member for said jaws, to accurately hold the work in its clamped position.

The air motor 18 is of a conventional type which can be made to rotate in opposite directions by controlling the supply of compressed air thereto and which will stall when a predetermined amount of torque is applied to its drive shaft. Therefore, the said motor will cause the workpiece to be clamped between a pair of top jaws with a predetermined amount of pressure and it will stall when that pressure has been reached even though the air supply is continued. Also, when the motor is reversed, the supplemental master jaws 12 and 13 will move away from the main master jaw 11 and thereby open up the top jaws and disengage the workpiece; then, if the air supply to the motor is not shut off, the supplemental master jaws will continue to move until they abut the end members 25 and 31 and the motor will stall. It will be understood, therefore, that the said jaw sets can be operated to move into clamping position upon the workpiece by simply turning on the air supply which will rotate their respective motors in a clamping direction until the workpiece has been firmly clamped. The said jaws may then be disengaged from the workpiece by turning on the air supply which will rotate the motor in the opposite direction until the jaws have fully opened. This manner of operation of the clamping jaw sets greatly facilitates the use of the chuck and avoids the need of special attention in stopping the rotation of the air motors when the jaws have been opened or closed.

Our present invention is particularly directed to the provision of means for quickly and accurately centering the workpiece upon the chuck before it is clamped thereon by the above described operation of the clamping jaws. The said centering means preferably includes centering bars 32 which are slidable in radial slots 33 in the base 5 and are equally spaced between the clamping jaw sets at distances of 120 degrees. The said bars 32 have slide pins 34—34 extending laterally therefrom into lateral slots 35—35 in the sides of the slots 33; the said pins being preferably used to minimize the amount of friction in the movement of said bars in their respective slots and thereby greatly facilitating the operation of the centering means.

The said centering bars 32 are moved radially in their respective slots 33 by means of a common scroll gear 37 and have mounted thereon a set of centering jaws 36 which are carried by the outward movement of the bars into engagement with the inner side of the workpiece and thereby quickly center said workpiece upon the chuck and between the open sets of clamping jaws prior to the closing of said clamping jaws.

The scroll gear 37 is rotatably mounted upon the axis of the chuck base in a supporting block 38, by means of frictionless bearings 39 and 40, and is rotated by means of a bevelled pinion 41 which is rotatably mounted in the block 38 and driven by a shaft 42.

In order to provide for rotating said shaft 42 with a suitable tool, or motor, we provide a mechanism which includes a housing 43 that is mounted in the flange 5-a of the chuck base and extends inwardly therefrom below the top surface of the base. Within the said housing, there is rotatably mounted a driving member 44 having in its outer end a recess 45 for receiving a suitable tool.

Since it is extremely important that the amount of force applied by the centering jaws against the workpiece be controlled, in order to avoid distortion of the workpiece, there is provided between the said driving member 44 and the shaft 42 a friction drive mechanism including a cup-shaped friction liner 46 which is contained in the inner end of said driving member and is in frictional engagement with a friction member, such as the ball 47, that is also in engagement with a friction liner 48 of a driven member 49 which is connected to the said shaft 42.

This friction drive mechanism includes a thrust bushing 50 which surrounds the shank of the member 44 and is slidably secured in the casing 43 by a set screw 51. The said thrust bushing thrusts against an annular shoulder 52 on the driving member 44 through suitable yielding means, such as springs 50-a, which thrust against bearings 53 and 54 that are seated on said shoulder. The tension of said springs may be varied to cause different degrees of torque to be transmitted to the shaft 42, by means of an adjusting sleeve 55 that is rotatably mounted in the casing 43 and threaded to the thrust bushing 50 for varying the thrust of the operating member against the friction ball 47.

Figure 1:
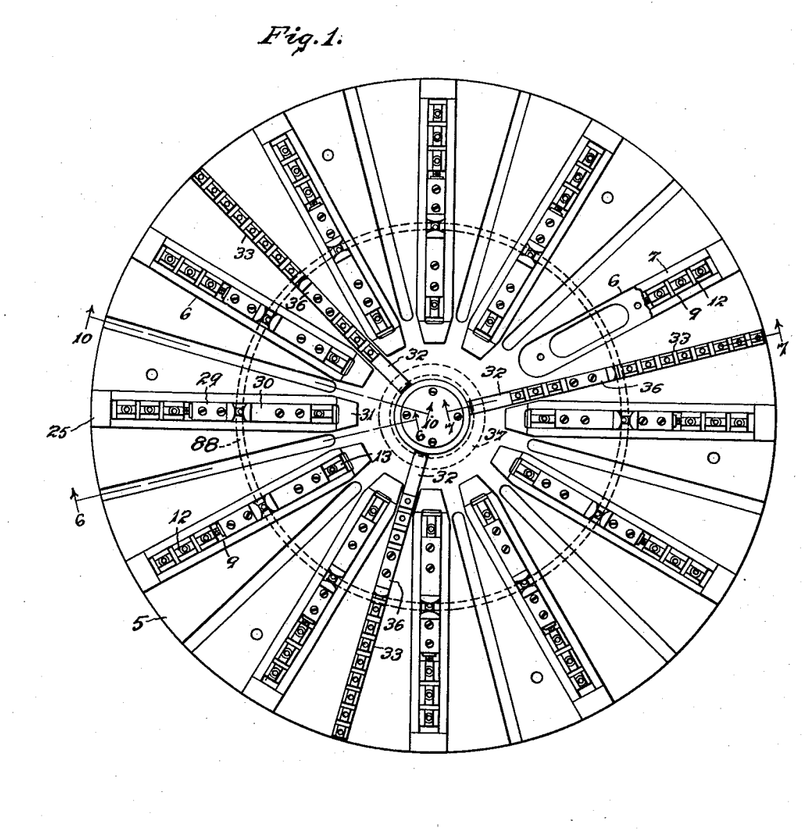
Fig. 1 is a plan view of a chuck constructed in accordance with this invention and showing one of the jaw units broken away.
Figure 2:
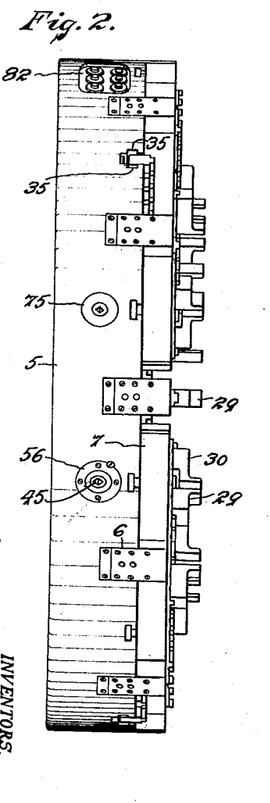
Fig. 2 is a side view of said chuck.
Figure 3:
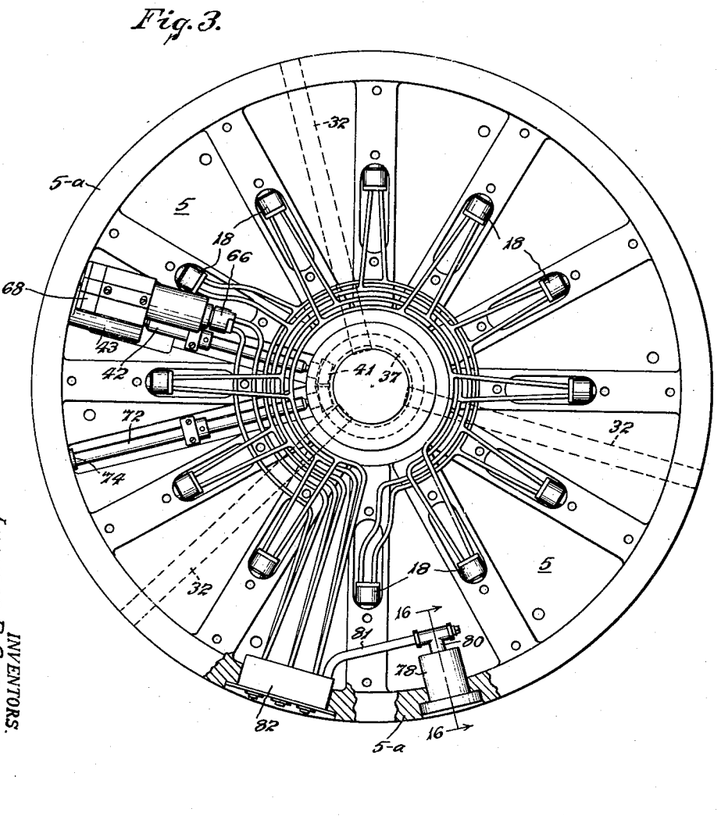
Fig. 3 is a bottom view of said chuck with portions broken away to better illustrate parts thereof.
Figure 4:
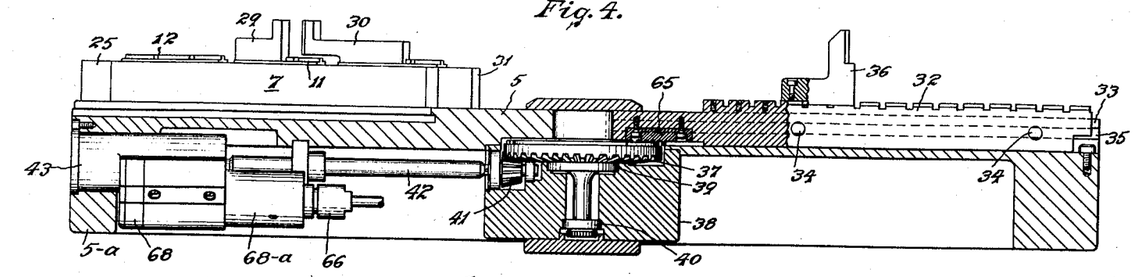
Fig. 4 is an enlarged sectional view taken along lines 6—6 and 7—7 of Fig. 1 with certain parts thereof shown in section.
Figure 5:
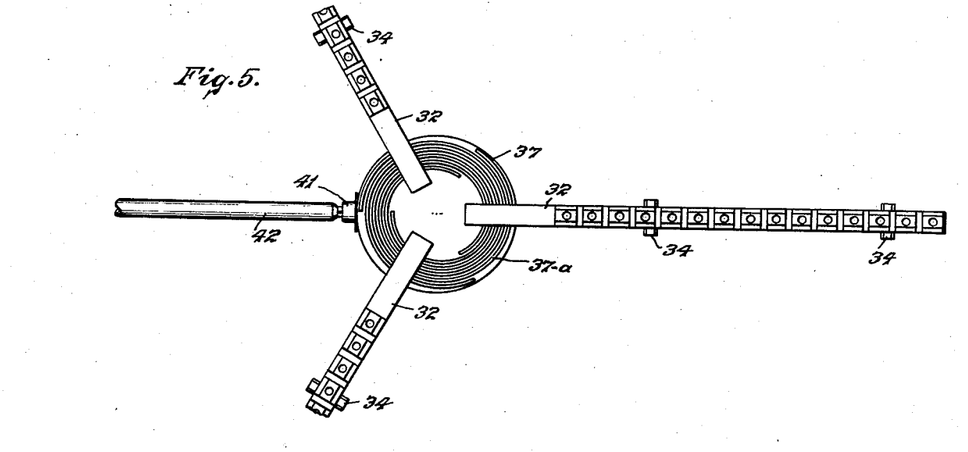
Fig. 5 is a schematic plan view illustrating the relationship of the centering bars and the mechanism for the operation thereof.
Figure 6:
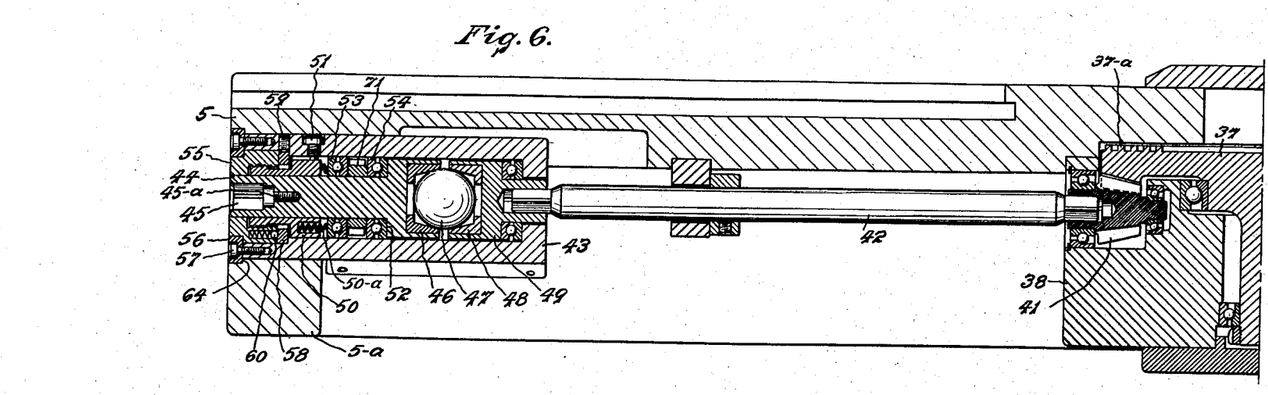
Fig. 6 is a further enlarged sectional view on line 6—6 of Fig. 1.
Figure 7:
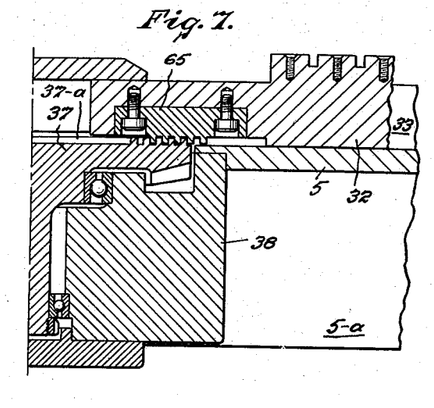
Fig. 7 is a similar sectional view taken along a portion of line 7—7 of Fig. 1.
Figure 8:
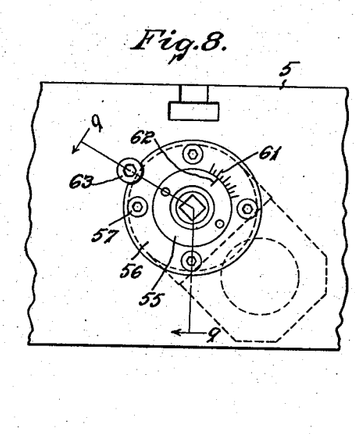
Fig. 8 is a side view of a portion of the chuck containing the mechanism shown in Fig. 6.
Figure 9:
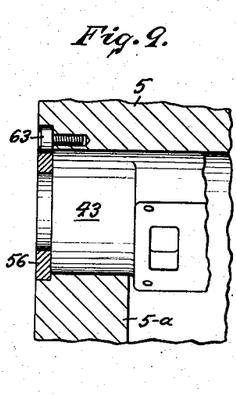
Fig. 9 is a side view of the chuck showing said portion of the chuck partly in section along line 9—9 of Fig. 8.

The said sleeve 55 is secured in adjusted position with a clamping ring 56 which is mounted upon the end of the casing 43 by means of clamping screws 57. A locating ring 58 is also used for locating the adjusting sleeve 55 in different positions of adjustment. This ring 58 fits against an annular shoulder within the casing 43 and is secured in position by a set screw 59. The said ring 58 also has a series of recesses upon the outer face thereof which are engaged by a spring pressed detent 60 for locating the adjusting sleeve 55 in different positions to obtain the desired amount of torque between the driving member and the shaft 42 and said torque is preferably indicated by graduations 61 upon the clamping ring 56 which cooperate with an indicating mark 62 on the adjusting sleeve 55, as shown in Fig. 8.

The entire casing 43 and the friction mechanism therein is secured in position in the flange 5-a by means of a suitable set screw 63 which is threaded to the chuck base and has a head that overlaps and engages a recessed portion of the clamping ring 56 and thereby secures the said ring against a shoulder 64 in the base to prevent longitudinal movement of the housing 43.

Each of the bars 32 has mounted thereon an insert 65 with teeth which engage the scroll thread 37-a of the scroll gear 37 and rotation of said scroll gear will simultaneously and identically move all of the centering bars radially for the same distance and in the same direction so that the workpiece can be centered accurately upon the chuck and between the open clamping jaws within very close limits.

It is here noted that the workpiece may be centered either from the inside, as illustrated in the drawings, or from the outside. To center said workpiece from the outside, the centering jaws 36 are placed upon the bars 32 so that they will engage the outside of the workpiece and they will then be moved inwardly for a centering operation instead of outwardly as shown.

When it is desired to rotate the shaft 42 manually for a centering operation of the centering bars 32, a suitable tool may be inserted in the recess 45 for locating the member 44. Rotation of said member will rotate the ball 47 and therethrough also rotate the member 49 and the shaft 42 with the pinion 41 thereon. The said pinion will rotate the scroll gear 37 and thereby cause the three centering bars 32 to be simultaneously moved radially in their respective slots and cause centering of the workpiece by the centering jaws 36.

In order that the above described centering means may be operated with power, our improved chuck is provided with an auxiliary driving mechanism which includes a suitable air motor 66 having a drive shaft 67 which drives a gear train which is mounted in a gear box 68. This gear train includes a drive pinion 69 which is connected to the shaft 67 and meshes with an idler gear 70 that in turn meshes with a driven gear 71 which is secured to the driving member 44. The said motor 66 is preferably mounted in a housing 68-a which extends from the gear box 68 and a set screw 68-b secures the motor against rotation. This motor is also of the type that is rotatable in either direction by controlling the air supply thereto and, when desired, can also be made to stall upon delivering a predetermined amount of torque so as to limit the pressure applied to the workpiece by the centering jaws.

When said motor 66 is used for driving the shaft 42, the recess 45 may be plugged with a suitable screw inserted into said recess and extending into the threaded hole 45-a.

Figure 10:
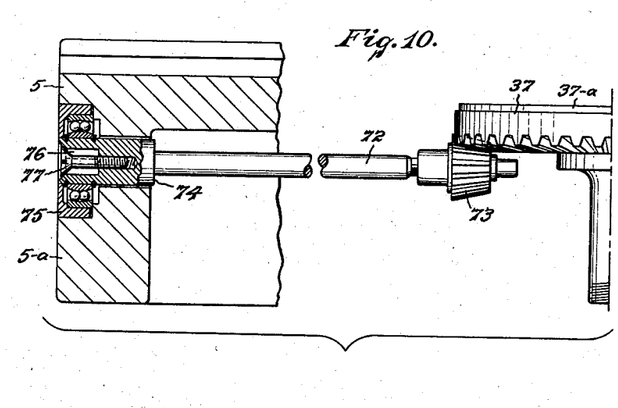
Fig. 10 is a side view, partly in section on line 10—10 of Fig. 1.
Figure 11:
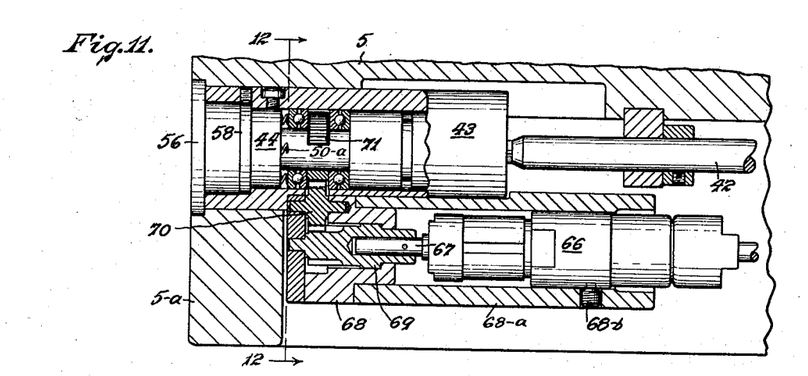
Fig. 11 is a side view, partly in section on line 11—11 of Fig. 12.
Figure 12:
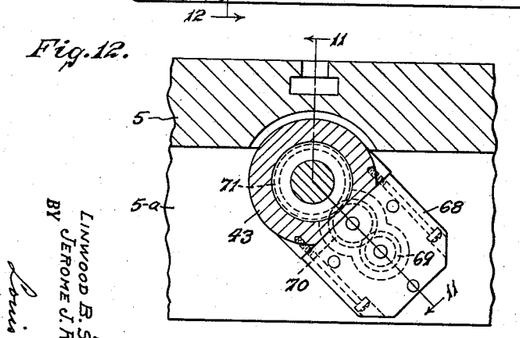
Fig. 12 is a side view of a portion of the chuck on line 12—12 of Fig. 11.
Figure 13:
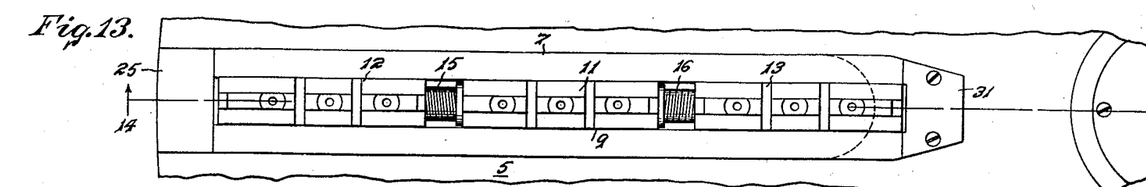
Fig. 13 is a plan view showing one of the clamping jaw units.

It may be desirable in some cases to rotate the scroll gear 37 with a greater torque than can be delivered through the friction drive mechanism so as to deliver a greater force to the centering jaws, and this is particularly true in cases where it is desired to center a large and heavy workpiece which is of such a shape that it will not be distorted by the extra pressure from said centering jaws. For this purpose, there is provided the mechanism illustrated in Fig. 10 which includes a separate drive shaft 72 that has a pinion 73 thereon which meshes with the scroll gear 37. The said shaft 72 is connected to a driving member 74 which is rotatable within a casing 75 that is secured in a recess in the flange 5-a of the chuck base. The said driving member 74 has a recess 76 therein to receive a suitable tool for manually rotating said driving member and thereby applying a direct torque to the shaft 72. In order to prevent the use of the said direct driving means for ordinary centering operations, the recess 76 is plugged by a screw 77 which will prevent the insertion of the tool into the recess 76 but can be removed when such tool is to be used.

Figure 16:
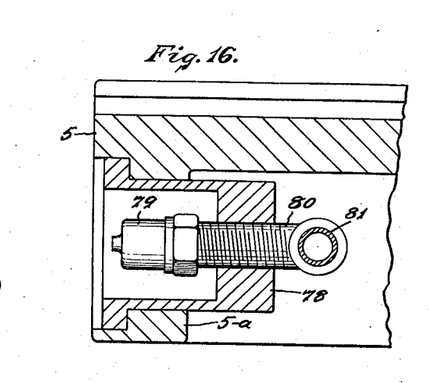
Fig. 16 is a sectional side view on line 16—16 of Fig. 3.

As illustrated in Fig. 16, there is also mounted in the flange 5-a of the chuck base a receptacle for a connection with a compressed air supply which includes a casing 78 that contains a suitable air nozzle connector 79 which is connected to a nipple 80 which in turn is connected to a main air pipe 81 that extends to the air system for delivering compressed air to all of the air motors contained in the chuck.

Figure 17:
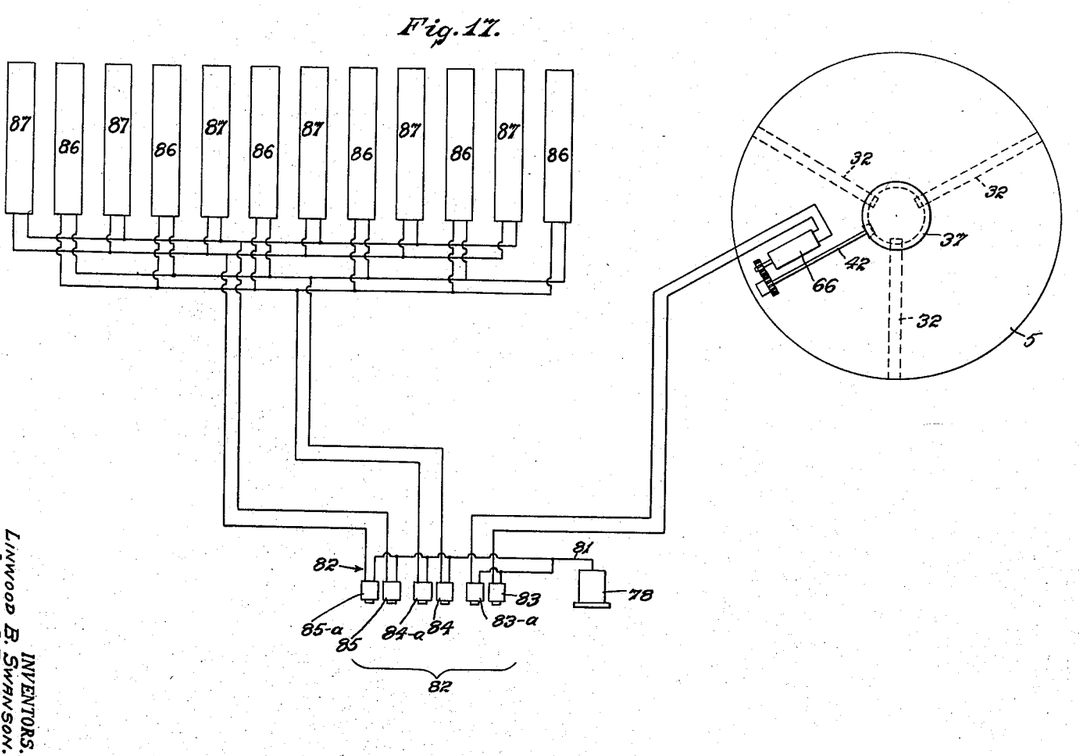
Fig. 17 is a diagrammatic view illustrating the circuit for operating the centering means and clamping jaws of our improved chuck.

The said air system is diagrammatically illustrated in Fig. 17 and includes a distributor 82 that is also mounted in the flange 5-a of the chuck and contains a series of valves which control the supply of compressed air from said pipe to the different air motors contained in the chuck. The said series of valves includes three sets of suitable air valves 83 and 83-a, 84 and 84-a, 85 and 85-a which are preferably of the type that is normally closed but can be opened by means of a pushbutton.

The valve 83 is connected to the motor 66 for rotating its shaft 67 to move the centering jaws 36 outwardly and the valve 83-a is also connected to the said motor 66 for rotating the shaft in a reverse direction to move the said centering jaws inwardly.

It is desirable, in cases where a large number of clamping jaw units are used, to divide said units into separate groups so as to reduce the volume of air pressure which is required for operating the clamping jaws. The said clamping jaw units are therefore divided so that, as shown, the valve 84 is connected to one side of the air motors of the group of clamping jaw units 86 and the valve 84-a is connected to the opposite side of the same motors to cause them to rotate in reverse direction. The valve 85 is connected to the air motors of the group of clamping jaw units 87 and the valve 85-a is connected to the opposite sides of the same air motors to cause them to rotate in reverse direction.

Assuming that the full number of clamping units is used, as shown in Fig. 17, the operation of our improved chuck is as follows:

With all of the clamping jaw units in open position and the centering jaws in retracted position, the workpiece, indicated at 88, is first placed between the open clamping jaws 29 and 30 and outside of the centering jaws 36. A suitable air delivery nozzle (commonly called an "air gun") which is connected to an air supply is then pressed against the connector 79 so as to supply air pressure from said gun through the pipe 81 to each of the valves in the distributor 82. The pushbutton of the valve 83 is then pressed inwardly and this will deliver air pressure to the motor 66 and cause rotation of the shaft 42 which will in turn rotate the scroll gear 37 and move the centering jaws 36 outwardly into engagement with the workpiece and thus center said workpiece upon the chuck and between the open clamping jaws. The pushbutton of the valve 83 is then released and the scroll gear will retain the jaws 86 in their centering position so as to hold the workpiece centered upon the chuck in fixed position. The pushbutton of the air valve 84 is then pressed and this will supply the air pressure to the motors of the group of clamping units 86 and cause said motors to move the jaws 29 and 30 of said clamping units into clamping position against the opposite sides of the workpiece and, upon engagement with said workpiece, automatically secure it to the chuck in the manner described above and in the said Patent No. 2,757,009. The pushbutton of the valve 85 is then pressed and this will deliver air pressure to the motors of the group of clamping units 87 and cause said units to also become clamped upon the workpiece in the same manner.

When it is desired to remove the workpiece from the chuck, the pushbuttons of the valves 83-a, 84-a and 85-a are operated to cause retraction of the centering jaws and opening of the clamping jaws, respectively, whereupon the said workpiece may be readily lifted from the chuck.

We claim:

1. In a chuck including a base having a plurality of sets of clamping jaws separately slidable on said base, a clamping screw carried by said jaws for drawing them into clamping position upon a workpiece, and means operable by the force applied to the jaws by said screw for automatically securing each of the jaws directly to the base upon said jaws being forced into clamping position; the combination of centering means including three centering bars radially slidable on said base and disposed between adjacent sets of said clamping jaws, a scroll gear interconnecting said centering bars for simultaneous and identical radial movement relatively to the said axis of the base, and centering jaws mounted on said centering bars and adapted to center a workpiece relatively to said axis while disposed between said clamping jaws with said jaws in open position.

2. In a chuck including a base having a plurality of radial slots therein and a set of clamping jaws in each of said slots self-adjustable to a workpiece on said base and adapted to engage said workpiece and automatically secure it to the base upon being clamped between said jaws, the combination of three equally spaced slots extending radially on said base between adjacent sets of said clamping jaws, a centering bar slidable in each of said three slots, a centering jaw on said centering bar, means for simultaneously moving said centering bars radially to center a workpiece about the axis of the base, and means for simultaneously causing movement of the plurality of jaw sets into clamping engagement with the workpiece and securing said workpiece to the base while in centered position.

3. In a chuck including a base having a plurality of clamping jaws thereon, means for centering a workpiece about the axis of the base while disposed between said jaws with said jaws in open position, the said centering means including three separate bars disposed equally about said axis and slidable radially therefrom, means on said centering bars engageable with the workpiece for centering it and retaining it in centered position between the clamping jaws, a scroll gear interconnecting said centering bars for simultaneous and identical movement in opposite directions relatively to said axis, means for rotating said scroll gear including a drive shaft, and means for limiting the amount of torque applied to said drive shaft for rotating the scroll gear.

4. In a chuck including a base having a plurality of radial slots therein, a set of clamping jaws in each of said radial slots, three separate radial slots in said base disposed between the said plurality of slots, centering means including centering bars simultaneously slidable in said three slots, means on said bars for centering a workpiece about the axis of the base while disposed between the said clamping jaws with the jaws in open position, motor driven means for simultaneously actuating the centering means, the said clamping jaw sets being divided into separate groups, and motor driven means for separately operating each of said groups of clamping jaws into clamping position upon the workpiece.

5. In a chuck including a base having a plurality of clamping jaw sets radially slidable thereon, centering means including three separate centering bars radially slidable and equally disposed about said axis between adjacent pairs of said radial slots, means on said bars for engaging a workpiece, means for simultaneously and moving said bars radially for engaging and centering the workpiece relatively to said axis and retaining it in centered position, a motor for simultaneously operating said centering bars, and torque limiting means for limiting the amount of torque applied by said motor for the operation of the centering means.

6. In a chuck including a base having a plurality of radial slots therein with a set of clamping jaws slidable in each of said slots, three separate slots between said radial slots and equally disposed about the axis of the base, a centering bar slidable in each of said separate slots, a centering jaw on each of said centering bars for engaging a workpiece and retaining it in centered position about the said axis, a scroll gear for interconnecting said centering bars and simultaneously applying identical movement thereto relatively to said axis, a pinion in mesh with said scroll gear, a drive shaft for rotating said pinion, means for rotating said drive shaft, friction means between said rotating means and the drive shaft for limiting the amount of torque applied to the drive shaft, and separate means for drawing the clamping jaws into clamping position against the workpiece while in centered position.

7. In a chuck including a base having a plurality of radial slots therein and a set of clamping jaws slidable in each of said slots, the combination of centering means including three separate slots disposed between said plurality of slots and equally spaced about the axis of the base, a centering bar slidable in each of said three slots, a centering jaw selectively mounted upon each of said bars to engage a workpiece and retain said workpiece in centered position upon the base, a scroll gear interconnecting said bars and adapted to apply simultaneous and identical movement to said centering bars within their respective slots, a pinion for driving said scroll gear, a drive shaft for rotating said pinion, a rotatable drive member having means for applying rotation thereto, friction drive means between said drive member and the drive shaft adapted to limit the amount of torque from the drive member to the drive shaft, and means for adjusting the friction means to vary the amount of torque transmitted from said drive member to the drive shaft.

8. A chuck as set forth in claim 7 wherein the means for adjusting the friction means include a thrust member thrusting the drive member in the direction of the friction means, a bushing anchored upon the base and threaded to said thrust member, the said bushing being rotatable for varying the amount of thrust applied by the thrust member, a stationary retaining ring having a plurality of formations therein about the axis of the bushing, and a spring pressed detent engageable with said formations for retaining the bushing in different adjusted positions.

9. In a chuck including a base having a plurality of radial slots therein and a set of clamping jaws in each of said slots for clamping a workpiece to said base, the combination of centering means including three centering bars radially slidable on said base, a centering jaw on each of said bars for engaging the workpiece and centering said workpiece about the axis of the base while disposed between the clamping jaws with said jaws in open position, a scroll gear interconnecting said centering bars and adapted for moving them simultaneously and identically in opposite directions relatively to said axis, friction means for limiting the amount of power applied to said scroll gear for the movement of said centering bars, means for driving said scroll gear through said friction means, and separate means directly connected to said scroll gear for driving the said gear independently of the friction means.

10. In a chuck, a clamping jaw unit including a bar having a slot therein, clamping jaws separately slidable in said slot, a clamping screw for drawing said clamping jaws into and out of clamping position relatively to a workpiece on said base, a gear box mounted upon the end of said bar and closing the end of the slot therein, a gear box train contained within said gear including a driving pinion, an idler gear and a driven pinion, a sliding connection between said driven pinion and the clamping screw, a motor mounted on said bar and connected to said driving pinion for driving said clamping screw, and an axial recess in said driven pinion adapted to receive a tool for manual rotation of said clamping screw.

11. In a chuck including a base having a radial slot therein, a clamping jaw unit comprising at least two master jaws separately slidable in said slot, a clamping screw connected to said master jaws and rotatable for moving said jaws into clamping position, a motor for driving the clamping screw and a gear train between said motor and clamping screw; the combination of a sliding connection between the gear train and the clamping screw whereby the said clamping screw may move with said clamping jaw unit within the said slot while remaining connected to the gear train.

12. In a chuck including a base having a plurality of radial slots therein, clamping jaw units mounted in said slots and each including a liner bar secured in one of said slots and having a jaw slot therein, a plurality of master jaws separately slidable in said jaw slot and including a central master jaw and supplemental master jaws at opposite ends of said central jaw, a clamping screw rotatably secured to the said central master jaw against axial movement relatively thereto and threaded to the supplemental master jaws for moving the latter jaws in opposite directions relatively to the central master jaw, centering means separately movable on said base for centering a workpiece between a pair of top jaws mounted upon the central master jaw and one of the supplemental master jaws while the said clamping jaws are in open position, a motor for driving the clamping screw, a gear train between said motor and clamping screw, and a sliding connection between the gear train and the clamping screw whereby the said master clamping jaws may move within the jaw slot while remaining connected to the gear train.

13. In a device including a base and a plurality of pairs of connected clamping jaws separately slidable upon said base and a clamping screw carried by said jaws for drawing them into clamping position upon a workpiece; the combination of centering means disposed between adjacent sets of said clamping jaws and movable independently thereof for centering a workpiece about the axis of the base while disposed between the said clamping jaws with said clamping jaws in open position.

14. In a chuck including a base, a pair of opposed clamping jaws each separately slidable in a slot in said base, a single clamping screw carried by said jaws for drawing them into clamping position upon a workpiece centered upon said chuck, the said jaws being jointly freely slidable in said slot to permit adjustment of the jaws along the slot in accordance with the position of the workpiece upon the chuck, and means operable by the clamping force applied to said jaws by the screw for automatically securing said set of jaws directly to the base upon the workpiece being clamped therebetween; the combination of centering means independent of said clamping jaws and movable on said base for centering a workpiece thereon and retaining the workpiece in fixed centering position relatively to the axis of the base.

References Cited in the file of this patent

UNITED STATES PATENTS

| | | |
|---|---|---|
| 1,881,905 | Page et al. | Oct. 11, 1932 |
| 2,245,384 | Bullard | June 10, 1941 |
| 2,323,091 | Johnston et al. | June 29, 1943 |
| 2,729,077 | Holloway | Jan. 3, 1956 |
| 2,757,009 | Sloan et al. | July 31, 1956 |
| 2,757,010 | Sloan et al. | July 31, 1956 |
| 2,759,735 | Cross | Aug. 21, 1956 |